H. KESSLER.
HOSE CONNECTION.
No. 180,241.　　　　　　　　　　Patented July 25, 1876.
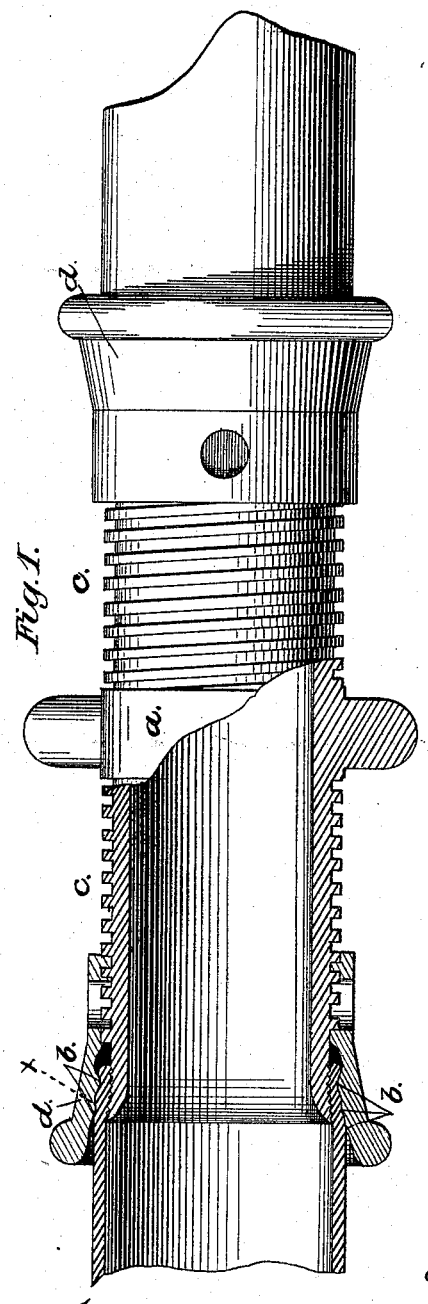
Witnesses:
Marcus Simon
Gottfried Radermacher
Inventor:
H. Kessler

UNITED STATES PATENT OFFICE.

HEINRICH KESSLER, OF OBERLAHNSTEIN, PRUSSIA.

IMPROVEMENT IN HOSE-CONNECTIONS.

Specification forming part of Letters Patent No. 180,241, dated July 25, 1876; application filed January 30, 1875.

*To all whom it may concern:*

Be it known that I, HEINRICH KESSLER, of Oberlahnstein, in the Kingdom of Prussia, have invented certain new and useful Improvements in Hose-Connections, of which the following is a specification:

The object of the said invention is to connect the ends of hose pipes or tubes by clamping them between the conical surfaces of collars, which may be screwed together for that purpose. A connecting-pipe that carries screw-collars, with internal conical surfaces, has end pieces permanently fitted upon it, that prevent the removal of the collars, and that have counterpart conical surfaces, between which and those of the collars the hose is clamped.

To enable those skilled in the arts to which it appertains to make and use my invention, I will proceed to describe its construction and operation with reference to the drawing.

The central pipe or connection $a$ is furnished with screw-threads on its external surface, and has the cones $x$ at each end, over which the ends of the hose to be united may be slipped. The screw-collars $b$ may be screwed outward over the ends of the hose, to clamp them between their own interior conical surfaces and the corresponding exterior surfaces of the cones $x$.

The conical surfaces may be roughened to enable them to hold well. The cones $x$ are soldered or otherwise secured to the connection $a$, to prevent the removal of the collars $b$. The collars and the connection are provided with suitable means for the application of spanners, by which they may be turned.

I claim as my invention—

The connecting-pipe $a$, having screw-threads and the conical part $x$, in combination with the threaded collar $b$.

Oberlahnstein, Prussia, 22d October, 1874.

H. KESSLER.

Witnesses:
 MARCUS SIMON,
 GOTTFRIED RADERMACHER.